J. & I. FLEISCHMAN.
AUTOMOBILE RADIATOR.
APPLICATION FILED DEC. 29, 1916.
1,252,794.
Patented Jan. 8, 1918.
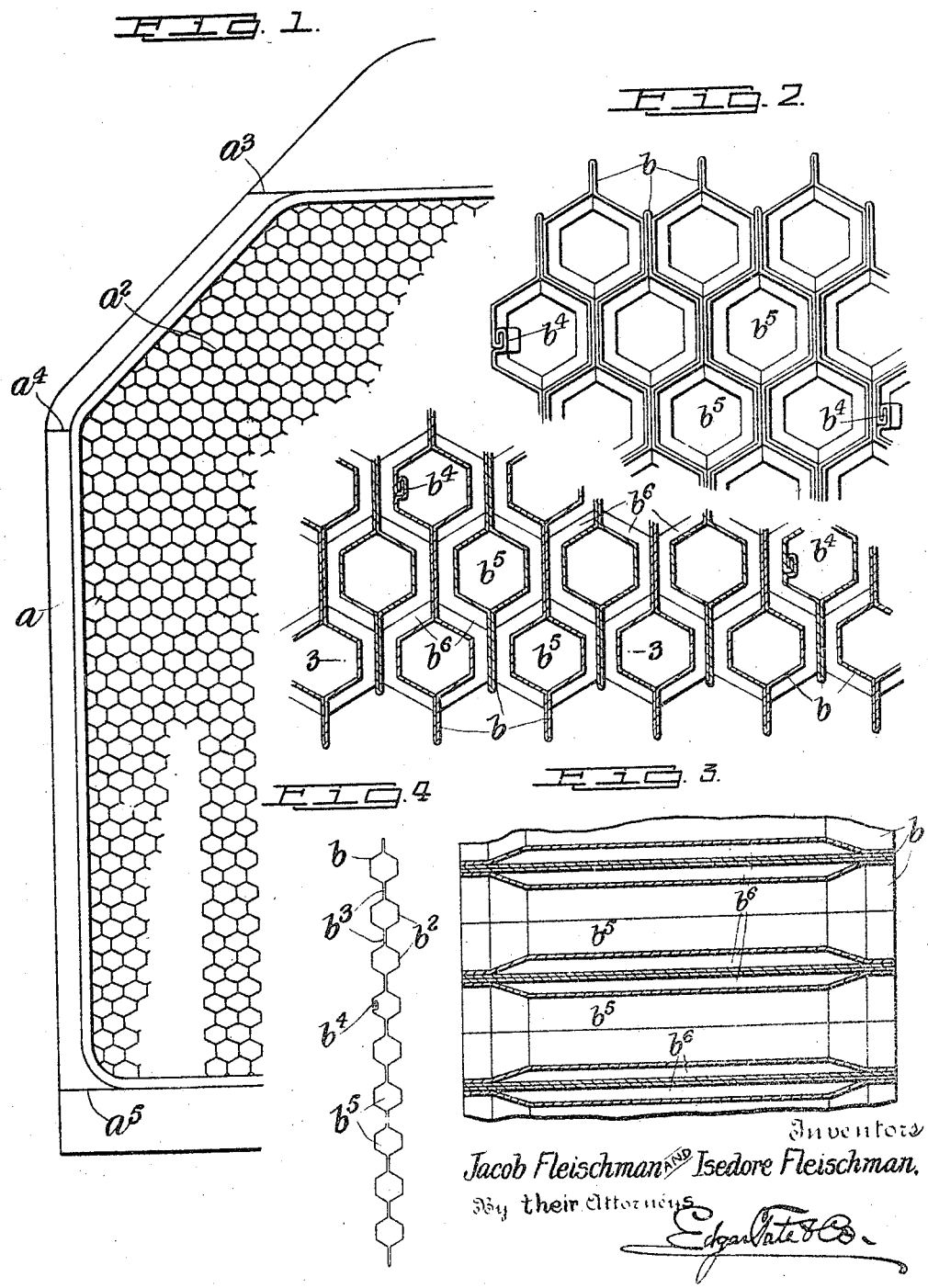
Inventors
Jacob Fleischman and Isedore Fleischman.
By their Attorneys
Edgar Tate & Co.

UNITED STATES PATENT OFFICE.

JACOB FLEISCHMAN AND ISEDORE FLEISCHMAN, OF JERSEY CITY, NEW JERSEY.

AUTOMOBILE-RADIATOR.

1,252,794.

Specification of Letters Patent.

Patented Jan. 8, 1918.

Application filed December 29, 1916. Serial No. 139,474.

*To all whom it may concern:*

Be it known that we, JACOB FLEISCHMAN and ISEDORE FLEISCHMAN, citizens of the United States, and residing at Jersey City, in the county of Hudson and State of New Jersey, have invented certain new and useful Improvements in Automobile-Radiators, of which the following is a specification, such as will enable those skilled in the art to which it appertains to make and use the same.

This invention relates to the radiators of automobiles, and the object thereof is to improve the construction of devices of this class so as to facilitate the repair thereof when necessary.

The invention is fully disclosed in the following specification, of which the accompanying drawing forms a part, in which the separate parts of our improvement are designated by suitable reference characters in each of the views, and in which:—

Figure 1 is a view of a part of the front end of an automobile radiator constructed according to our invention, but on a reduced scale;

Fig. 2 a similar view on an enlarged scale and showing the details of our improvement;

Fig. 3 a transverse sectional view on the line 3—3 of Fig. 2; and,

Fig. 4 an end view of one of the sections of the radiator.

The invention described and claimed herein is an improvement on that described and claimed in U. S. Letters Patent No. 975,343 granted to Jacob Fleischman Nov. 11, 1910, and in the drawing forming part of this specification, we have shown at $a$ a part of a radiator of an automobile as usually constructed.

In forming or constructing radiators of the class specified, it has been customary to form the body or water and air circulating portion $a^2$ of separate vertically arranged sections $b$ of sheet metal composed of separate side parts brought together and secured together at the top and bottom, or of a single sheet of metal folded centrally so as to bring the ends thereof together, and when said sections were made of separate parts brought together at the top and bottom they were soldered together at said top and bottom, and when said sections were formed from a single sheet folded and the ends thereof brought together, they were soldered together either at the top or bottom, and said sections when brought together and connected to form the body $a^2$ of the radiator, the said points of connection of the parts of the separate sections were at the top or bottom, and as the leaks which usually occur sooner or later were at such points of connection of the parts of the sections $b$, and these points were necessarily built up in the water tanks or chambers at the top and bottom of the radiator and in order to solder these leaks or make repairs it was necessary to detach the separate parts of the framework of the radiators or detach the top and bottom water tanks or chambers, and this was a difficult and expensive operation by reason of the fact that the framework or casing of such radiators is usually made of separate parts connected at $a^3$, $a^4$ and $a^5$ and the connection of such parts at the points named being made by soldering.

As above stated the operation of re-soldering or repairing the separate sections $b$ of the radiator under the conditions named was a difficult and expensive operation, and the object of this invention is to do away with this difficulty and to render the re-soldering or repairing of the radiator or radiators more simple and inexpensive.

It is a wellknown fact that leaks in radiators of this class occur almost universally at the points where the parts of the separate sections $b$ of the radiators are soldered together and in order to avoid the objections herein set out we form the separate sections $b$ from a single sheet of metal, which is first stamped to form in one side thereof spaced transverse grooves $b^2$ connected by webs $b^3$, and both end portions of the sheet thus formed are folded at predetermined points so as to bring the ends thereof together, as shown at $b^4$ in Fig. 4, and said ends are then folded or interlocked and soldered together in the usual manner.

This brings the soldering together of the end portions of the sheet from which the separate sections $b$ are formed at some point between the ends thereof according to the folding of the end portions of said sheet or the points at which they are folded, and this connection of said end portions may be on either side of the sections as will be readily understood.

With our invention the folding of the end portions of the sheet from which the separate sections $b$ are formed is preferably so made, or regulated as to place the soldering of the end portions of said sheets in different transverse lines when said sections are connected as shown in Fig. 2.

In doing the soldering at $b^4$ the radiator is placed on its side, after which the wire or other soldering material is passed through the air aperture or space $b^5$ in which the soldering is to be done and laid on the connection at $b^4$, and the flame of a torch is directed through the air aperture or space, and this melts the soldering material and solders and renders both air and water-tight the connection at $b^4$ of the end portions of the sheet or sheets from which the separate sections of the radiator are made.

It will be understood that the radiator body is made up in the same manner as in the patent hereinbefore referred to, or as any other devices of this class, and is provided with the usual air spaces or passages $b^5$ and with the usual water circulating spaces or passages $b^6$, and the separate sections $b$ which form the body or honey-comb work of the radiator are connected as in said patent and as in other devices of this class.

The object of arranging the points of connection at $b^4$ of the ends of the sheets from which the separate sections $b$ of the radiator are formed as shown is to bring said point of connection of one section at such a distance from the corresponding point of another section or sections that in repairing the point of connection of one section, the corresponding point of another section will not be overheated and cause a leak, and while we prefer to arrange the points of connection at $b^4$ of the parts of the sections $b$ in staggered relation as shown in Fig. 2, any arrangement of this class may be employed which will be such as not to bring the said points of connection at $b^4$ of any two sections closely together or in the same transverse line.

With our improvement, as hereinbefore stated, we avoid the necessity of disconnecting the parts of the radiator frame or casing in order to repair leaks in the sections $b$ which make up the body of the radiator, and in this way the expense of resoldering is rendered a comparatively simple operation and one which can be much more expeditiously performed and at a minimum of expense compared with that necessary with radiators of this class as usually constructed.

Having fully described our invention, what we claim as new and desire to secure by Letters Patent, is:—

In a radiator of the class described, a body portion consisting of separate vertically arranged sections, each of which extend from the top to the bottom of the radiator, each of said sections being composed of a single sheet of metal having its extremities folded so as to bring the ends of the sheet together at a predetermined point intermediate the ends of the section, said ends being joined together, the joint of one of the sections being out of horizontal alinement with the joints of adjacent sections, whereby the joint of one section may be repaired without affecting the joints of adjacent sections.

In testimony that we claim the foregoing as our invention we have signed our names, in presence of the subscribing witnesses, this 27th day of December, 1916.

JACOB FLEISCHMAN.
ISEDORE FLEISCHMAN.

Witnesses:
  C. E. MULREANY,
  H. C. THOMPSON.